United States Patent Office 3,516,879
Patented June 23, 1970

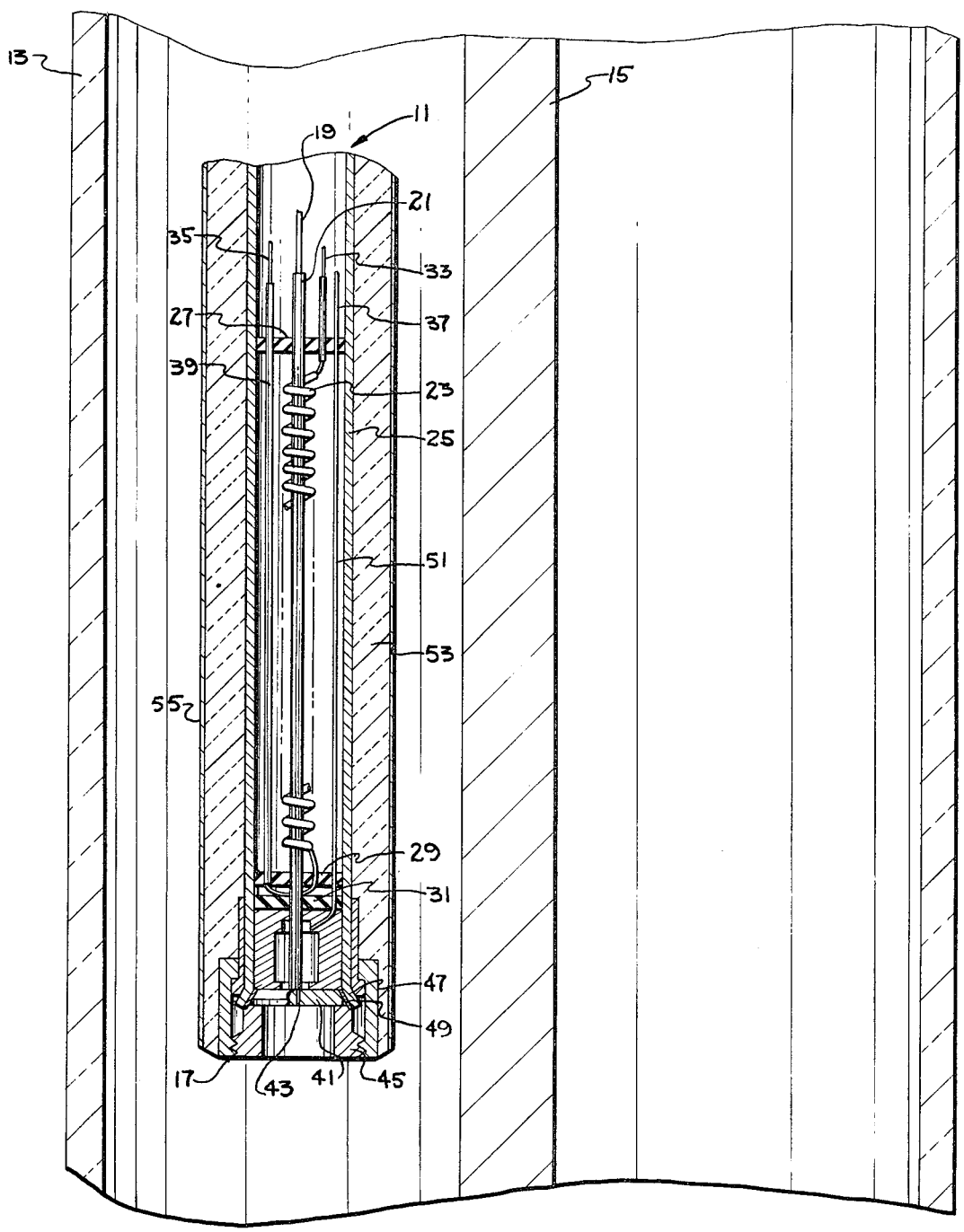

3,516,879
PROCESS OF FORMING PARTICLES IN A
CRYOGENIC PATH
T. O. Paine, Deputy Administrator of the National Aeronautics and Space Administration, with respect to an invention of Robert H. Globus, Pasadena, Calif.
Filed June 13, 1968, Ser. No. 736,848
Int. Cl. C06d 5/00
U.S. Cl. 149—1
8 Claims

ABSTRACT OF THE DISCLOSURE

A method and apparatus for producing fine particles of less than one micron diameter comprising gasifying the substance to be produced in fine particles, maintaining the substance in the gaseous state while injecting it through a small orifice below the surface of a cold, preferably cryogenic bath, whereby fine particles of the material are produced. Preferably the material in the gaseous state is diluted with an inert gas prior to its injection into the cryogenic bath. Useful gelled propellants can be formed in accordance with this method through the production of fine particles of a reactive component in a cryogenic propellant.

ORIGIN OF INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

Field of the invention

This invention is in the field of producing small submicron particles and further relates to the formation of gelled cryogenic compositions.

Description of the prior art

Prior to the herein invention it had been contemplated to form particles of material by directing a fluid or gas against the surface of the cryogenic bath whereupon the desired particles are produced. This technique, however, did not controllably produce fine particles of submicron size. Further, the prior method is not suitable as the injected material would tend to freeze out on the vessel walls.

In addition to the foregoing, it had been appreciated that gelled propellants would be useful in space zero-G conditions. The gelling of certain propellants prior to this invention was accomplished by mixing a solid material with the propellants. For example, a typical system involved lithium fluoride particles added as a gelling agent for $OF_2$. These prior gelling agents such as the lithium fluoride generally did not contribute in any way to the performance of the system. Additionally, the solid particles could not be used in restartable propulsion systems, since the injector heat soakback evaporates the propellants. Thus, the particles such as lithium fluoride remain as solid particles in the system and interferes with the functioning of close tolerance parts and clog orifices. Prior to the herein invention, no successful attempt was made to utilize a highly reactive component as a gelling agent, which reactive component would contribute to the overall performance of the propellant.

Thus, an object of this invention is to provide a method for forming submicron particles of material.

Another object of this invention is to provide an apparatus for use in producing the submicron particles of material.

Still another object of this invention is to provide a method of forming gelled cryogenics.

Still one further object of this invention is to provide new gelled cryogenic compositions.

SUMMARY OF THE INVENTION

The above and other objects of this invention are accomplished by the herein device, method and resulting compositions, which involve directing a gaseous stream of the material to be formed into fine particles into a cryogenic bath below the surface of the cryogenic liquid. A device is provided comprising a long heated tube which maintains the material in the gaseous state until the time it contacts the cryogenic liquid. The heated tube directs the gaseous material through an orifice at the bottom thereof, which is disposed below the surface of the cryogenic liquid. Additionally the heated tube is preferably insulated thereabout so that the tube may be heated though submerged in the cryogenic bath. The cryogenic bath is vigorously stirred with a stirrer or other means during the time that the gaseous material is injected below the surface thereof. The gaseous material which forms the fine particles upon impact with the cryogenic liquid is generally premixed with an inert diluent gas that is also inert to the cryogenic, prior to being forced down the heated tube. If only the small particles are desired, the cryogenic material can be sublimed off leaving the desired material. In forming gelled cryogenics in accord with this invention, the gelling material which is formed into fine particles is injected through the aforedescribed tube. When gelling propellants for safety purposes, it is preferable to form the fine particles in a cryogenic liquid that is not the propellant material, than adding the cryogenic propellant to the vessel in which the small particles are formed after most of the original cryogenic material has been removed.

BRIEF DESCRIPTION OF THE DRAWING

The figure is a cross-sectional view of the device for injecting the material to be formed into fine particles positioned in a vessel in which it would be used.

DESCRIPTION OF THE PREFERRED EMBODIMENTS

In order to understand the method of the invention, attention is first directed to the drawing wherein the device 11 is shown disposed in a glass vessel 13 in which the cryogenic material is disposed. A stirrer rod 15 is shown disposed in the vessel. It is connected to blades (not shown) which continuously mix the cryogenic material while the fine particles are being formed. The device 11 is inserted such that the bottom end 17 is disposed below the surface of the cryogenic liquid, thus the gas is injected directly into the mixed cryogenic bath.

The gas of the material to be formed into fine particles is directed through a small inner tube 19. Generally, as indicated, it is mixed with a second inert gas which serves as a diluent and carrier for the main material. The tube 19 is surrounded by a glass tube 21 which serves to electrically insulate it from a resistive heating coil 23 thereabout and thus prevent grounding the coil 23. The tube 19 is concentrically disposed within a larger outer tube 25 and is held therein by a top Teflon spacer element 27 and two similar bottom spacers 29 and 31. The coil 23, which can be a length of nichrome wire, extends most of the length of the tube 19. The leads 33 and 35 respectively for the coil 23 are insulated by glass tubes 37 and 39 respectively to prevent grounding. The glass tubes are held in place by the spacer elements 27 and 29.

The inner tube 19 together with its outer glass tube 21, terminates at an orifice plate 41 located at the bottom end thereof. The orifice plate has a slight opening 43 through which the gas can flow into the cryogenic liquid. A threaded collar 45 holds the orifice plate 41 in place against the flanged end 47 of the outer tube 25. A copper flare saver 49 is preferably disposed between the orifice plate 41 and the flange portion 47. This helps to prevent any leakage of the material in that area. A thermocouple 51 is connected to the tube 19 near the orifice 43. The thermocouple permits the monitoring of the inlet tube temperature during use. The outer tube 25 is surrounded by an asbestos insulation 53 with a thin layer of aluminum foil 55 about the outer surface.

The vessel 13, which was indicated to be of glass so as to view the condition of the material therein, has a top (not shown) through which openings are provided for the stirrer rod 15 and the device 11 of this invention. Further, there are vent valves in the top and openings to selectively admit additional materials into the vessel. Thus, as can be seen, the incoming reagent passing through line 19 is heated and maintained in a gaseous state until it passes out through the orifice 43 beneath the surface of the continuously stirred cryogenic liquid where the reagent is flash frozen. Alternative to the arrangement shown in the figure, the orifice plate 43 can be welded directly to the outer tube 25 almost adjacent the end of the heater coil. This eliminates the area within the fitting where the heater coil is not present and further prevents any possibility of the reagent becoming frozen before leaving orifice 43.

It can thus be appreciated that the aforedescribed device used in the method of this invention can firstly be used to form small particles of virtually any substance, including metals, by injecting that material in the vapor state into a cryogenic bath. Secondly, the herein invention can be utilized to provide a gelled cryogenic by utilizing the fine particle material as a base for the gelling of the cryogenic. This as indicated is particularly useful in certain propellant applications. Thirdly, the herein invention can be used to provide fine particles of non-cryogenics wherein the particles are initially formed in a cryogenic, the cryogenic may be removed and the fine particles used due to their inherent qualities of solubility or surface properties or they may be mixed with other substances to form a gel-like material. The fine particles can be useful in a pharmaceutical application. In other words, the final end product of this invention does not necessarily have to be a cryogenic.

Obviously, when the material to be formed into fine particles is a gas at ambient conditions or above, it must be kept in a frozen state in order to maintain its coherency, whether this be through a gel or mere storage under low temperature conditions. The same, of course, applies for material that is normally liquid. However, where the material to be formed into fine particles is normally a solid, such as metals, or other products, then the storage conditions need not be at low temperatures. In this latter case, the method of the herein invention is the vehicle used to form the initial fine particles through contact of the material in the gaseous state with a very low temperature bath.

An example of a propellant gel that is particularly useful and which forms a basis for the specific example to follow is fine particles of $ClF_3$, chlorine trifluoride, in liquid oxygen difluoride, $OF_2$. Various of the aliphatic hydrocarbons could be formed into small particles by this invention in diborane to produce the gel. Another system could, for example, involve methane as the fine particle gelling material in liquid hydrogen. It should be apparent that in order for a successful gel to exist, the two materials comprising the gel must be virtually insoluble in each other. Thus, it can be seen that propellant gels can be formed of any two compatible materials which are insoluble in each other and will produce the desired end result when utilized in a rocket engine. The amount of gelling particles will be determined by the desired properties of the gel. Generally, the gel should have a Structure Index of from 1500 to 2000 dynes/cm.$^2$.

As previously indicated, small submicron particles of metals are additionally contemplated as being embraced within the concept of this invention. The metal to be formed into the small particles would first be vaporized to a gaseous state and mixed with an inert diluent gas such as helium. The mixture would then be injected in accord with this invention in a cryogenic bath of liquid helium or argon, for example. The fine particles of metal formed would be quite useful in various powder metallurgic techniques. A material of particular interest in such small particle size is boron. The submicron boron particles presently available are very expensive. The herein invention could significantly reduce the cost of such materials. An example of producing the boron submicron particles would, for example, comprise burning $BI_3$ with hydrogen in a plasma arc, mixing the vapor with helium and injecting the mixture into liquid helium.

As previously described, a diluent gas is often used together with the gaseous material to be formed into the fine particles. This diluent gas serves various functions. For example, chlorine trifluoride is extremely reactive. The use of the diluent gas which could, for example, be helium, is thus a safety precaution to prevent a great concentration of the reactive material in any portion of the system prior to condensation. Another reason for generally using a diluent is that the lowest portion of the injection tube is not easily heated, as can be seen from the figure. The use of the diluent helps to move the material to be condensed to the last portion of the tube so that it will enter the cryogenic bath still in a gaseous state. Obviously, any clogging in the bottom of the injection tube would completely prevent the successful operation of the herein method.

Additionally, it is theorized that the particle size of the material to be formed into the particles is governed to a degree by the amount of that material available. Thus, in entering the cryogenic in a relatively diluted state, smaller particles will tend to form. It should be pointed out that it is necessary that the diluent is non-condensable in the system. The diluent gas thus will pass out of the vessel through provided vent valves. The ratio of the amount of the diluent to the material to be formed into small particles could obviously vary considerably. The dilution can range from 16 to 43 volumes of diluent to 1 volume of reagent.

The cryogenic bath can comprise any of the materials commonly utilized. It is preferred that the cryogenic bath be of an inert material, such as liquid nitrogen. Obviously, the material selected cannot react with the material to be formed into small particles. Liquid helium is another example of a relatively inert cryogenic material. As has been discussed, it is preferable to initially form the small particles in an inert cryogenic, subsequently removing the inert cryogenic and replacing it with the material that will form the gel. This is particularly so in the area of propellants where the end cryogenic material to be gelled would be sensitive and present a potential safety hazard when the initial particles are being formed directly therein. Thus, the initial cryogenic can be pumped out of the system at a suitable pressure until virtually all of it is removed, and then the end cryogenic can be brought into the vessel.

It is believed that the diameter of the orifice opening of the tube leading into the cryogenic bath for admitting the material to be formed into small particles is not necessarily critical. Submicron sized particles have been produced with an orifice having a diameter of .025 inch. Since it is theorized that one of the most important criteria in forming small particles is the dilution of the material to be so formed, it can then be appreciated that the diameter of the orifice is secondary. Further, it has been found that the flow rate of the material to be formed into the fine particles does not affect the size of the particles formed.

It is believed that the invention will be further understood from the following detailed example:

Example

In this example, fine particles of chlorine trifluoride, $ClF_3$, were prepared in liquid nitrogen. Liquid nitrogen was then removed and $OF_2$ was condensed in the vessel to form a gel. Laboratory holding vessels were first evacuated and 89.3 grams of gaseous $ClF_3$ were placed in the vessels. The $ClF_3$ pressure in the holding vessels was 11 p.s.i.a. The vessels were then pressurized to 393 p.s.i.a. with helium. Diffusers in the holding vessels insured that the gaseous mixture was homogenous. The volume concentration based on the total volume of gas to the volume of the $ClF_3$ was 35.8. The glass mixing vessel had a 4-inch inside diameter, with walls one-fourth of an inch thick, and was sixteen inches deep. The mixing vessel was surrounded by a conventional Dewar arrangement. The injection tube and stirrer were inserted through apertures provided in the top of the vessel and disposed as seen in the figure. Initially, the injection tube heater was turned on. This was followed by a purge of the interior of the injection tube with helium. The purpose of the purge is to prevent leaks into the tube. This leak prevention is required because of the highly reactive reagent vapors which are used as a source to prepare the fine particles. The mixing vessel was then cooled down by filling the external Dewar with liquid nitrogen. Next, the mixing vessel was filled with liquid nitrogen to a level of 2100 milliliters. Neat helium was then flowed through the injection tube at a rate of 30 p.s.i./min. from a 16 liter source. The injection tube thermocouple read at a temperature of 70° C. at this point. The neat helium flow was then stopped and the flow of a mixture of helium and $ClF_3$ was simultaneously started from a 32-liter source at the rate of 11 p.s.i./min. While the mixture of the helium and $ClF_3$ was flowing, additional liquid nitrogen was added to the mixing vessel to make up for evaporation losses. Liquid nitrogen that evaporated was vented out through the vent system. The liquid nitrogen level was maintained between 1800 and 2100 milliliters. Flow of the helium and $ClF_3$ continued until the pressure in the holding tanks decayed to 71 p.s.i.a. Thus, 73.1 grams of $ClF_3$ was injected into the liquid nitrogen. The injection tube orifice diameter that was used during this flow material was .025 inch. The orifice was located six inches below the liquid nitrogen level in the mixing vessel.

After all of the $ClF_3$ was injected into the liquid nitrogen, the liquid nitrogen level was then reduced to 1700 milliliters by evaporation through a vent valve in the top of the vessel. The settling rate of the particles formed was then measured. The particles settled at the rate of .75 inch per hour. Based on Stokes law, this settling rate indicated a particle size of .9 micron. The liquid nitrogen level was then reduced to 400 millimeters by further evaporating off the liquid nitrogen. This was accomplished by pumping on the system at 200 millimeters of mercury. As the liquid nitrogen level decreased, a gel was formed. The structure index of the gelled liquid nitrogen was then measured. This was indicated to be 1450 dynes/cm.$^2$.

Oxygen difluoride, $OF_2$, was then added to the mixing vessel as a gas and condensed in the vessel. During the first half hour of the addition of the $OF_2$, the vent valve at the top of the vessel was opened so that the remaining liquid nitrogen would evaporate off. It was noticed that no significant quantity of the $OF_2$ was lost because its vapor pressure is negligible at the boiling point of the liquid nitrogen.

The $OF_2$ was added in increments from tanks of known volume and pressure. The quantity added was measured by the change in level in the mixing vessel and was confirmed by solving the $PV=nRT$ relationship with the known pressure drop in the $OF_2$ tank. After each addition, the mixture was sparged with helium and mechanically stirred. The sparge with helium served to remove any traces of the liquid nitrogen that would have been left in the gel. The Structure Index was then measured at $-196°$ C. The gel composition having 93.3 weight percent $OF_2$ with a remainder $ClF_3$ had a Structure Index of 1900 dynes/cm.$^2$. At 94.4 weight percent $OF_2$ the Structure Index was 1450 dynes/cm.$^2$, and at 94.9 weight percent $OF_2$, the Structure Index was 950 dynes/cm.$^2$. The maximum quantity of gel prepared was 800 milliliters or 1440 grams. After the measurements of the Structure Index at the various $ClF_3$ concentrations were taken, the mixture of the $OF_2$ and the $ClF_3$ particles were disposed of by slow evaporation.

The previous example was repeated several times, varying the dilution of the $ClF_3$ to helium mixture over a range from 16 to 37 volumes of helium gas to one volume of the $ClF_3$ gelling agent vapor. Additionally, runs were made varying the injection velocity from 340 to 670 cm.$^3$/sec. without apparently affecting the ability of the particles to gel the liquid nitrogen.

What is claimed is:
1. A method of forming small particles of a material comprising:
    providing said material in a gaseous state,
    providing a bath having a composition non-reactive with said material,
    maintaining said bath at a temperature sufficient to condense said material,
    injecting said gaseous material below the surface of said bath whereby fine particles are formed.
2. The method of claim 1 comprising:
    heating said gaseous material to maintain it in that state until it contacts said bath.
3. The method of claim 1 further comprising:
    stirring said bath while said gaseous material is being injected therein.
4. The method of claim 1 further comprising:
    diluting said gaseous material with an inert gas prior to injection into said bath.
5. The method of claim 1 comprising:
    maintaining said bath at cryogenic conditions.
6. The method of claim 1 further comprising:
    injecting a sufficient amount of said material into a cryogenic bath whereby a gel of said particles is formed in situ in a said bath.
7. The method of claim 6 comprising:
    forming said particles in a cryogenic bath of an inert first material,
    removing said first material from said particles,
    and forming said gel with a second different cryogenic material.
8. The method of claim 7 wherein said particles are formed from an interhalogen and said second cryogenic is $OF_2$.

References Cited

UNITED STATES PATENTS

| | | | |
|---|---|---|---|
| 3,177,652 | 4/1965 | Lewis | 149—1 X |
| 3,197,348 | 7/1965 | Skolnik et al. | 149—1 X |
| 3,221,494 | 12/1965 | Chu | 149—1 X |
| 3,257,802 | 6/1966 | Kaufman | 149—1 X |
| 3,282,750 | 11/1966 | Hemstreet | 149—1 |
| 3,354,646 | 11/1967 | Maya et al. | 149—1 X |
| 3,377,801 | 4/1968 | Altman | 149—1 X |
| 3,428,501 | 2/1969 | Blanchard et al. | 149—1 |

CARL D. QUARFORTH, Primary Examiner

S. J. LECHERT, Jr., Assistant Examiner

U.S. Cl. X.R.

149—109, 22; 264—3, 28; 55—95; 62—55.5